United States Patent
Murakami

(10) Patent No.: US 8,400,705 B2
(45) Date of Patent: Mar. 19, 2013

(54) CHARGED PARTICLE MIGRATION TYPE DISPLAY PANEL AND METHOD OF MANUFACTURING CHARGED PARTICLE MIGRATION TYPE DISPLAY PANEL

(75) Inventor: Kenichi Murakami, Kuwana (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 117 days.

(21) Appl. No.: 12/960,427

(22) Filed: Dec. 3, 2010

(65) Prior Publication Data
US 2011/0075249 A1    Mar. 31, 2011

Related U.S. Application Data

(63) Continuation-in-part of application No. PCT/JP2009/055119, filed on Mar. 17, 2009.

(30) Foreign Application Priority Data

Jun. 3, 2008    (JP) .................................. 2008-145334

(51) Int. Cl.
*G02B 26/00*    (2006.01)
(52) U.S. Cl. ........................................... 359/296
(58) Field of Classification Search .............. 359/296; 345/107, 105; 204/600, 450; 430/32, 34, 430/38, 5, 24, 396
See application file for complete search history.

(56) References Cited

U.S. PATENT DOCUMENTS

2009/0180172 A1    7/2009    Murakami
2009/0296196 A1*   12/2009    Van Delden ................. 359/296

FOREIGN PATENT DOCUMENTS

| JP | 2000-284111 A | 10/2000 |
| JP | 2007-265869 A | 10/2007 |
| JP | 2008-051881 A | 3/2008 |

OTHER PUBLICATIONS

Japanese Patent Office, International Search Report for International Application No. PCT/JP2009/055119, mailed May 19, 2009.

* cited by examiner

Primary Examiner — Tuyen Tra
(74) Attorney, Agent, or Firm — Baker Botts L.L.P.

(57) ABSTRACT

There is provided a charged particle migration-type display panel (1) which has a plurality of cells (40) partitioned by partitions (31) between a transparent substrate (10) and a back substrate (20) placed opposite to each other, and charged particles (41, 42) sealed in the respective cells (40), and in which the partitions (31) provided upright on the back substrate (20) are formed of a translucent material, and the tips and the side faces of the partitions (31) are covered with a resin (32) containing an opaque or semi-transparent dark-colored coloring material, thereby forming a black matrix structure.

1 Claim, 9 Drawing Sheets

L1=L2

L1<L3

L1<L4

CHARGED PARTICLE MIGRATION TYPE DISPLAY PANEL AND METHOD OF MANUFACTURING CHARGED PARTICLE MIGRATION TYPE DISPLAY PANEL

CROSS-REFERENCE TO RELATED APPLICATIONS

The present application is a continuation-in-part of International Application No. PCT/JP2009/055119, filed on Mar. 17, 2009, which claims the benefit of Japanese Patent Application No. 2008-145334, filed on Jun. 3, 2008; the disclosures of which are incorporated herein by reference.

TECHNICAL FIELD

The present invention relates to a charged particle migration type display panel which has a black matrix provided at a partition which forms a plurality of cells for enclosing charged particles, a method of manufacturing the charged particle migration type display panel and a charged particle migration type display device, and, particularly, to a charged particle migration type display panel which can improve the contrast ratio and a method of manufacturing such a charged particle migration type display panel.

BACKGROUND ART

Research and development have been made on display panels (hereinafter simply called "charged particle migration type display panels") which use a charged particle migration system as an image display device, such as a personal digital assistant and electronic paper. For example, a charged particle migration type display panel with an active-matrix structure is configured to have a transparent substrate to which a common electrode is mounted, a back substrate on which a plurality of pixel electrodes are mounted, and partitions disposed between the transparent substrate and the back substrate, and have charged particles of dark color like black, and charged particles of light color like white, enclosed in individual cells partitioned by the transparent substrate, the back substrate and the partitions. As a predetermined voltage is applied to individual pixel electrodes to generate an electric field between the back substrate and the transparent substrate, the dark-colored or light-colored charged particles are migrated to the transparent substrate side to display black, white, or gray.

Such a charged particle migration type display panel has a problem such that since the partitions made of a transparent (in practice yellowish brown-colored) material are seen as a white-colored lattice pattern when in black display, the contrast ratio of the white display which has the maximum luminance to the black display which has the minimum luminance is deteriorated. In this respect, a charged particle migration type display panel provided with means for concealing the lattice pattern of the partitions has been proposed.

There is known a charged particle migration type display panel configured so that a black matrix layer (black pattern) corresponding to partitions is provided on the inner surface of the transparent substrate or the back substrate. Further, there is also known a charged particle migration type display panel configured to have partitions formed of an opaque material of white, gray or the like, and have a black matrix layer formed on the top surfaces of the partitions.

However, the former charged particle migration type display panel mentioned above is configured to cover only the end faces of partitions with a black matrix layer, so that while the end faces of the partitions can be unseen from the front side of the transparent substrate, the transparent side faces of the partitions are visible from the oblique direction to the transparent substrate, thereby degrading the contrast ratio.

In the latter charged particle migration type display panel mentioned above, however, a filler, a dye, or a paint is contained in the material for the partitions to make the partitions opaque. In the case where an ultraviolet curing resin is used as a material for the partitions, there is a problem that the lower the transmittancy becomes, the more difficult it becomes for light to pass through the ultraviolet curing resin, so that it is not possible to form the partitions of a desired pattern with a high accuracy. In the charged particle migration type display panel of the prior art, therefore, even if the partitions could be made white or gray, the partitions themselves could not be made into a black matrix with a dark color close to black. As a result, as in the above case, the transparent side faces of the partitions are visible from the oblique direction to the transparent substrate, thereby degrading the contrast ratio.

DISCLOSURE OF THE INVENTION

The invention has been made in view of the aforementioned problem, and it is an object of the invention to provide a charged particle migration type display panel and a manufacturing method thereof, which can enlarge the portion of a partition concealed by a black matrix and reduce the transmittancy of the black matrix to improve the contrast ratio.

To achieve the object, a charged particle migration-type display panel according to one aspect of the invention is configured to have a plurality of cells partitioned by partitions between two substrates placed opposite to each other, with charged particles sealed in the respective cells, wherein the partitions provided upright on one of the substrates are formed of a translucent material, and tips of the partitions and at least parts of side faces thereof are covered with a resin containing an opaque or semi-transparent dark-colored coloring material to form a black matrix structure.

To achieve the object, a manufacturing method for the aforementioned charged particle migration type display panel according to one aspect of the invention includes a partition forming step of forming the partitions on the substrate, and a black-matrix pattern forming step of covering the partitions with a photo-curing resin used as the resin to form the black-matrix structure of a predetermined pattern, wherein the black-matrix pattern forming step includes a film deposition step of forming a film of the photo-curing resin uncured on the substrate, and covering the partitions with the film of the photo-curing resin, a masking step of masking at least a rear-face side of the substrate where the partitions are not formed, with a mask corresponding to the predetermined pattern, an exposure step of irradiating light from the rear-face side of the substrate to cure the portion of the film of the photo-curing resin which corresponds to the predetermined pattern, and a developing step of removing an uncured portion of the film of the photo-curing resin to let the photo-curing resin of the predetermined pattern remain.

To achieve the object, a manufacturing method for the aforementioned charged particle migration type display panel according to another aspect of the invention includes a partition forming step of forming the partitions on the substrate, and a black-matrix pattern forming step of covering the partitions with a photo-curing resin used as the resin to form the black-matrix structure of a predetermined pattern, wherein the black-matrix pattern forming step includes a dip coating step of dipping the partitions formed on the substrate into the uncured resin to cover the partitions with a film of the resin, and an exposure step of curing the film of the resin.

BRIEF DESCRIPTION OF THE DRAWINGS

FIGS. 9A and 9B are flowcharts illustrating a black-matrix pattern forming step included in the manufacturing process for the charged particle migration type display panel, FIG. 9A showing the first embodiment while FIG. 9B shows the second embodiment.

DETAILED DESCRIPTION OF THE INVENTION

General Description

Figure 1:
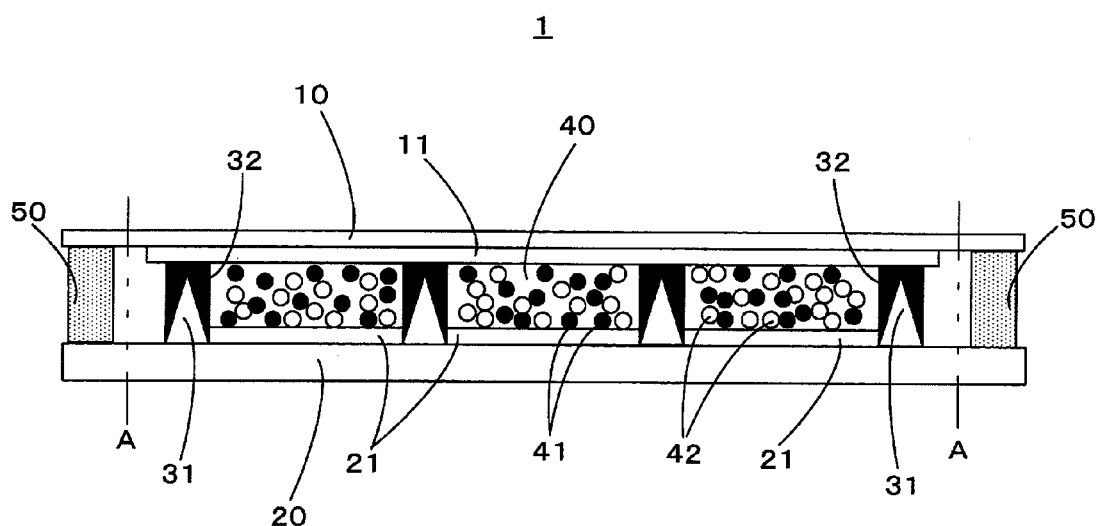
FIG. 1 is a side sectional view exemplarily showing a charged particle migration type display panel according to one embodiment of the invention.

A charged particle migration-type display panel according to one embodiment of the invention is configured to have a plurality of cells partitioned by partitions between two substrates placed opposite to each other, with charged particles sealed in the respective cells, wherein the partitions provided upright on one of the substrates are formed of a translucent material, and tips of the partitions and at least parts of side faces thereof are covered with a resin containing an opaque or semi-transparent dark-colored coloring material to form a black matrix structure.

With this configuration, the tips and side faces of the partitions made of a translucent material can be concealed by the black matrix structure composed of a resin containing a dark-colored coloring material. This can make the transparent side faces of the partitions unseen from the oblique direction to the transparent substrate, so that the contrast ratio can be improved.

A preferable configuration is that the partition is formed into a tapered shape or a wedge shape.

This configuration can increase the connection area of the resin that forms the black-matrix structure and the partition, further improving the connection strength. It becomes easier to cover the side faces of the partitions with the resin, thereby making it possible to increase the contrast ratio further.

A preferable configuration is that the resin is set taller than the partition, and a width of a lower end of the resin is set wider than a width of a lower end of the partition, so that the whole partitions are covered with the resin thereby forming a black matrix structure.

According to such a configuration, the whole partitions can be concealed with the resin which forms the black-matrix structure. This can make the transparent side faces of the partitions completely invisible from the oblique direction to the transparent substrate, thereby making it possible to improve the contrast ratio to the maximum. In addition, the lower end of the resin that forms the black-matrix structure is connected to the substrate surface on which the partitions are provided upright, thereby increasing the connection strength of the resin.

A manufacturing method for a charged particle portable type display panel according to one embodiment of the invention is a manufacturing method for the aforementioned charged particle portable type display panel, which includes a partition forming step of forming the partitions on the substrate, and a black-matrix pattern forming step of covering the partitions with a photo-curing resin used as the resin to form the black-matrix structure of a predetermined pattern, wherein the black-matrix pattern forming step includes a film deposition step of forming a film of the photo-curing resin uncured on the substrate, and covering the partitions with the film of the photo-curing resin, a masking step of masking at least a rear-face side of the substrate where the partitions are not formed, with a mask corresponding to the predetermined pattern, an exposure step of irradiating light from the rear-face side of the substrate to cure the portion of the film of the photo-curing resin which corresponds to the predetermined pattern, and a developing step of removing an uncured portion of the film of the photo-curing resin to let the photo-curing resin of the predetermined pattern remain.

According to such a method, the tips and side faces of the partitions made of a translucent material can be concealed by the photo-curing resin containing a dark-colored coloring material. This photo-curing resin can be exposed on the outer side as well as from the inside through the partitions made of the translucent material, so that even when the transmittancy is reduced with the dark-colored coloring material, it is still possible to cure the resin accurately.

It is preferable that in the masking step, each of a surface side of the film of the photo-curing resin, and the rear-face side of the substrate should be masked with the mask, and in the exposure step, light should be irradiated from both of the surface side of the film of the photo-curing resin, and the rear-face side of the substrate to cure the portion of the film of the photo-curing resin which corresponds to the predetermined pattern.

A manufacturing method for a charged particle portable type display panel according to another embodiment of the invention is a manufacturing method for the aforementioned charged particle portable type display panel, which includes a partition forming step of forming the partitions on the substrate, and a black-matrix pattern forming step of covering the partitions with a photo-curing resin used as the resin to form the black-matrix structure of a predetermined pattern, wherein the black-matrix pattern forming step includes a dip coating step of dipping the partitions formed on the substrate into the uncured resin to cover the partitions with a film of the resin, and an exposure step of curing the film of the resin.

Either one of the methods can manufacture the charged particle portable type display panel of the invention. The charged particle portable type display panel manufactured by such a method can enlarge the portion of the partitions concealed with the black matrix, and can reduce the transmittancy of the black matrix to improve the contrast ratio.

To achieve the object, a charged particle migration type display device according to one embodiment of the invention is configured to have the aforementioned charged particle portable type display panel of the invention. According to such a configuration, the transparent side faces of the partitions can be unseen from the oblique direction to the transparent substrate, thereby making it possible to improve the contrast ratio.

Effect of the Invention

The charged particle migration type display panel, the manufacturing method thereof, and the charged particle migration type display device according to the invention can enlarge the portion of a partition concealed by a black matrix and reduce the transmittancy of the black matrix to improve the contrast ratio.

DESCRIPTION OF ILLUSTRATED EMBODIMENTS

Figure 2:
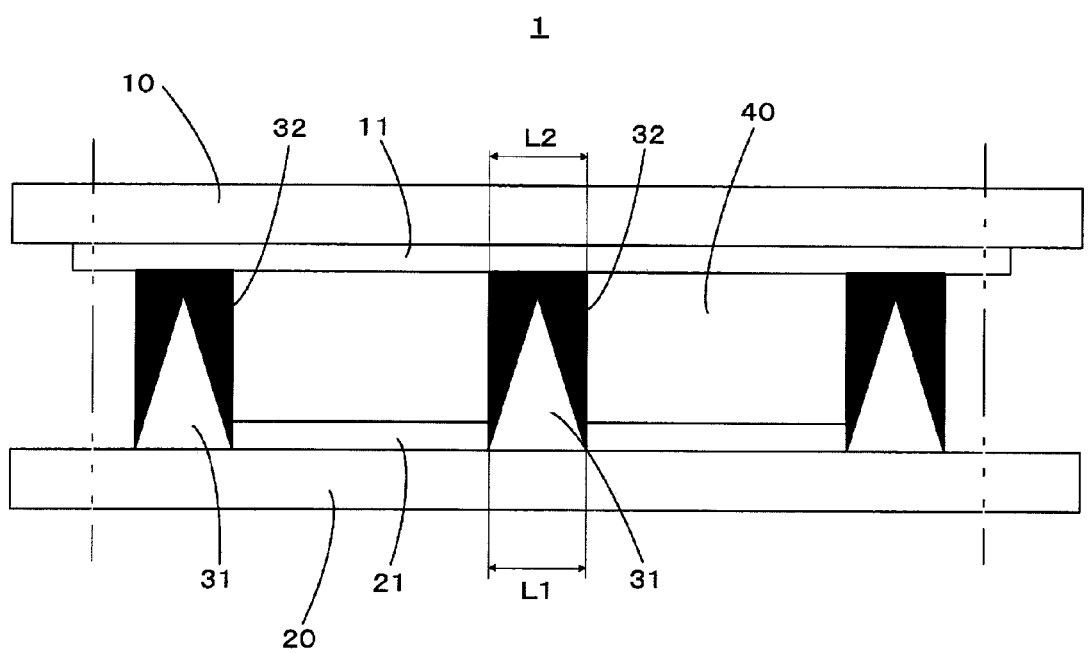
FIG. 2 is a partly enlarged view of the charged particle migration type display panel.

A charged particle migration type display panel according to a first embodiment of the invention and a manufacturing method of the same will be described referring to the diagrams.
<Charged Particle Migration Type Display Panel>
First, the outline of the charged particle migration type display panel according to the first embodiment of the invention will be described referring to FIGS. 1 and 2. FIG. 1 is a side sectional view exemplarily showing the charged particle migration type display panel according to the first embodiment of the invention. FIG. 2 is a partly enlarged view of the charged particle migration type display panel.

FIG. 1 is a schematic diagram and A, A in FIG. 1 are ellipsis lines. For the sake of convenience, only a part of the configuration of the charged particle migration type display panels 1 is shown inside the ellipsis lines A, A, and both end sides of the charged particle migration type display panel 1 is shown outside the ellipsis lines A, A.
<<General Configuration of Charged Particle Migration Type Display Panel>>
In FIG. 1, the charged particle migration type display panel 1 has a transparent substrate 10 provided on the display side (upper side in the diagram), and a back substrate 20 disposed approximately in parallel to the transparent substrate 10 apart therefrom at a predetermined interval therebetween. A common electrode 11 formed by a transparent member is mounted on the back of the transparent substrate 10, and a plurality of pixel electrodes 21 provided for the respective pixels are mounted on the surface of the back substrate 20 which faces the common electrode 11. The common electrode 11 is formed on the transparent substrate 10 in such a way that it commonly faces a plurality of pixel electrodes 21.

A region between the transparent substrate 10 and the back substrate 20 is separated into individual pixels with partition walls which are the integral partitions made of a transparent photo-curing resin, and a black matrix 32 made of a photo-curing resin containing an opaque or translucent dark-colored coloring materials. The charged particle migration type display panel 1 has a general configuration such that multiple structures each for one pixel as shown inside the ellipsis lines A, A in FIG. 1 are disposed consecutively in a matrix form. The structures of the partitions 31 and the black matrix 32 and how to form them will be described in detail later.

A display liquid containing black charged particles (dark-colored charged particles) 41 and white charged particles (light-colored charged particles) 42 are filled in individual cells 40 separated by the partition walls which are composed of the partitions 31 and the black matrix 32. Further, the display liquid is tightly sealed by fixing the ends of the transparent substrate 10 and the back substrate 20 with a sealer 50, such as an ultraviolet curing resin.

Here, the transparent substrate 10 is formed of a material which has high transparency and high insulation; for example, polyethylenenaphthalate, polyether sulphone, polyimide, polyethylene terephthalate, acryl, glass, silica glass, etc. can be used. Further, the common electrode 11 is formed of a material which has high transparency and can be used as an electrode; for example, tin oxide doped with indium which is a metallic oxide, tin oxide doped with fluoride, zinc oxide doped with indium, etc. can be used.

According to the embodiment, the back substrate 20 like the transparent substrate 10 is formed of a material which has high transparency and high insulation. The reason why the back substrate 20 is made transparent is to expose the black matrix 32 of a photo-curing resin from the inside through the transparent partitions 31. In the case where the photo-curing resin which forms the black matrix 32 is cured by visible light, polyethylenenaphthalate, polyether sulphone, polyimide, polyethylene terephthalate, acryl, glass, silica glass, or the like can be used as in the above case. On the other hand, in the case where the photo-curing resin which forms the black matrix 32 is cured by ultraviolet rays, a transparent material with high ultraviolet transmittancy is selected from the previously listed materials. The pixel electrode 21 is formed of a material with high electrical conductivity, such as gold or copper.

As the display liquid, a mixed solution of a solution which has high insulation, such as carbon hydride or silicone oil, and a dispersing agent, such as a surface-active agent or alcohol, can be used. In addition to the solution, vacuum, or a gas, such as air in which, for example, nitrogen and humidity are adjusted, can be used. The black charged particle 41 and the white charged particle 42 should be chargeable in the display liquid; for example, a paint or dye composed of an organic compound or an inorganic compound, or a synthetic resin containing a paint or dye can be used. The black charged particle 41 and the white charged particle 42 are charged to different polarities, namely, positive and negative polarities. The charged particles 41, 42 contained in the display liquid are not limited to black and white colors, and dark-colored charged particles other than black, and light-colored charged particles other than white can also be used.
<<Structures of Partition and Black Matrix>>
First, the black-matrix structure according to the first embodiment will be described referring to FIGS. 1 and 2. In these diagrams, the partitions 31 of the embodiment are made of a transparent photo-curing resin, and are provided upright on the substrate surface of the back substrate 20. The sectional shape of the partitions 31 is approximately a wedge shape (tapered shape) whose tip is tapered upward. The general shape of the partitions 31 is a lattice shape which crosses in the vertical and horizontal directions of the back substrate 20.

The material for the partitions 31 is not limited to the photo-curing resin. The partitions 31 can be formed of various materials which have sufficient translucency to visible light, ultraviolet rays, or infrared rays for curing the photo-curing resin to be the black matrix 32. The general shape of the partitions 31 is not limited to the shape of a series of vertical and horizontal lattices. For example, the general shape of the partitions 31 may be a cross shape with both the vertical and horizontal partitions being completely discontinuous, or a lattice shape with either the vertical or horizontal partitions being discontinuous.

The black matrix 32 according to the embodiment is an opaque or translucent member whose transmittance is lowered by letting a dark-colored coloring material, such as a paint or a color, contained in a photo-curing resin like that of the partitions 31. The black matrix 32 covers the partitions 31 with approximately a wedge-like cross-sectional shape from the tips to the entire sides, and, with the partitions 31, forms partition walls with approximately a rectangular cross-sectional shape. While the color of the black matrix 32 is preferably opaque black, it can be a dark color other than black as long as the black matrix 32 can conceal the partitions 31 as seen from the front side and oblique direction of the transparent substrate 10.

As shown in FIG. 2, the black matrix 32 is made taller than the partitions 31 and the lower end width, L2, of the black matrix 32 is made approximately the same as the lower end width, L1, of the partitions 31 according to the embodiment. The height and thickness of the black matrix 32 are determined according to the exposure sensitivity of the photo-curing resin which is the material of the black matrix, and the degree of light shielding of the black matrix. Anyway, the black matrix 32 has only to have a height and thickness which are sufficient to prevent the partitions 31 from being visible from the front side and the oblique direction of the transparent substrate 10.

Such a configuration can allow the whole partitions 31 to be concealed by the black matrix 32. Accordingly, the transparent partitions 31 can be made completely unseen from the front side and the oblique direction of the transparent substrate 10, thereby making it possible to improve the contrast ratio to the maximum. Since the black matrix 32 is formed of a photo-curing resin like that of the partitions 31, their upper end faces can be firmly adhered to the transparent substrate 10.

<<Example of Modification of Black-matrix Structure>>

Figure 3:
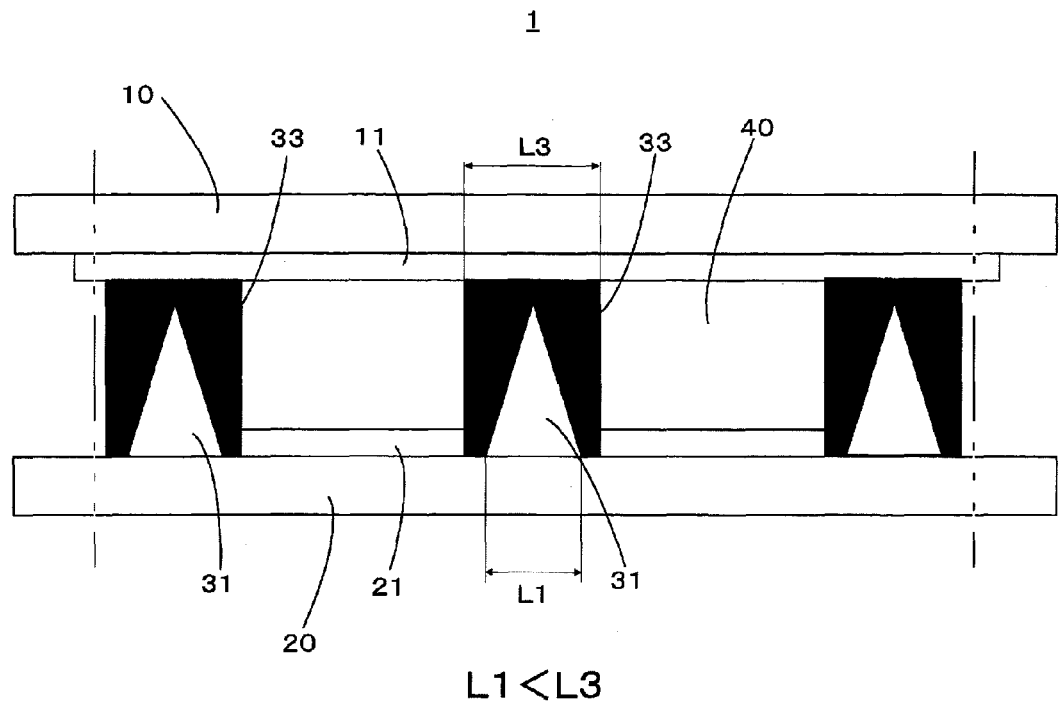
FIG. 3 is a partly enlarged view showing the structure of a black matrix according to a second embodiment.

FIG. 3 is a partly enlarged view showing a black matrix structure according to a second embodiment. In this diagram, a black matrix 33 is made taller than the partitions 31 and the lower end width, L3, of the black matrix 33 is made wider than the lower end width L1 of the partitions 31 according to the embodiment, so that the entire partitions 31 are covered with the black matrix 33.

Such a configuration can allow the whole partitions 31 to be concealed by the black matrix 33. In addition, the lower end of the black matrix 33 is jointed to the substrate surface of the back substrate 20, so that the bonding strength of the black matrix 33 can be increased.

Figure 4:
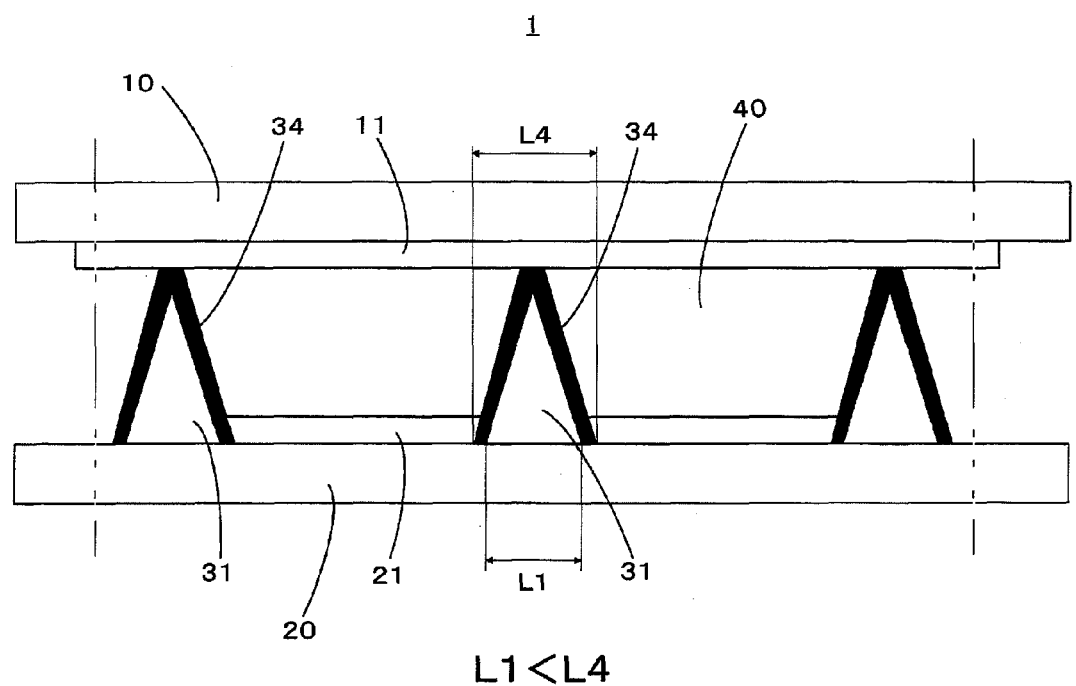
FIG. 4 is a partly enlarged view showing the structure of a black matrix according to a third embodiment.

FIG. 4 is a partly enlarged view showing a black matrix structure according to a third embodiment. In this diagram, according to the embodiment, a black matrix 34 is made taller than the partitions 31, the lower end width, L4, of the black matrix 34 is made wider than the lower end width L1 of the partitions 31, and the black matrix 34 is structured to have a constant thickness.

Such a configuration can likewise allow the whole partitions 31 to be concealed by the black matrix 34 as per the second embodiment. In addition, the lower end of the black matrix 34 is connected to the substrate surface of the back substrate 20, so that the connection strength of the black matrix 34 can be increased.

The black-matrix structure according to the invention is not limited to the structure which allows the whole partitions 31 to be covered with the black matrix 32, 33, 34 as per the first to third embodiments. For example, the lower end sides of the partitions 31 may not be seen through the transparent substrate 10 depending on the height of the partitions 31, or the transmittancy of the display liquid which fills the cells 40, etc., in which case it is possible to take a configuration such that the tip sides of the partitions 31 are partly covered with the black matrix. An embodiment for this configuration will be described below.

Figure 5:
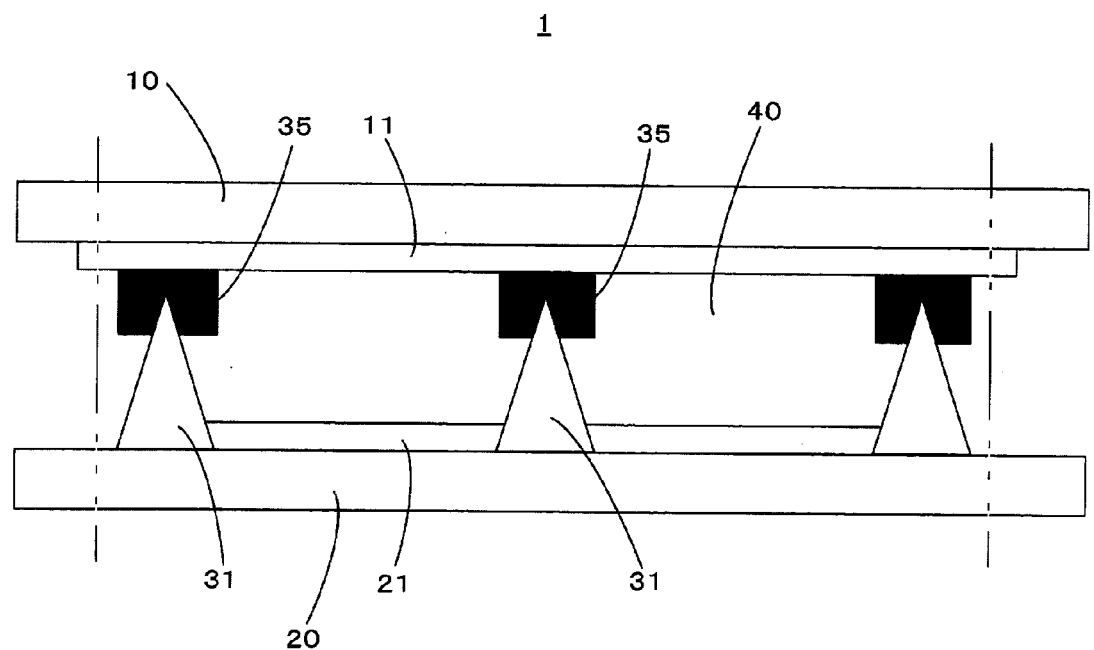
FIG. 5 is a partly enlarged view showing the structure of a black matrix according to a fourth embodiment.

FIG. 5 is a partly enlarged view showing a black matrix structure according to a fourth embodiment. In this diagram, the embodiment takes a configuration such that the tips of the partitions 31, and the sides thereof near the tips are partly covered with a black matrix 35.

Such a configuration can allow the whole partitions 31 to be partly concealed by the black matrix 35 within the range where the partitions 31 are visible from the front side and the oblique direction of the transparent substrate 10, and can improve the contrast ratio as in the first to third embodiments. In addition, since the tips of the partitions 31 are sharp, the black matrix 35 can be held adequately.

Figure 6:
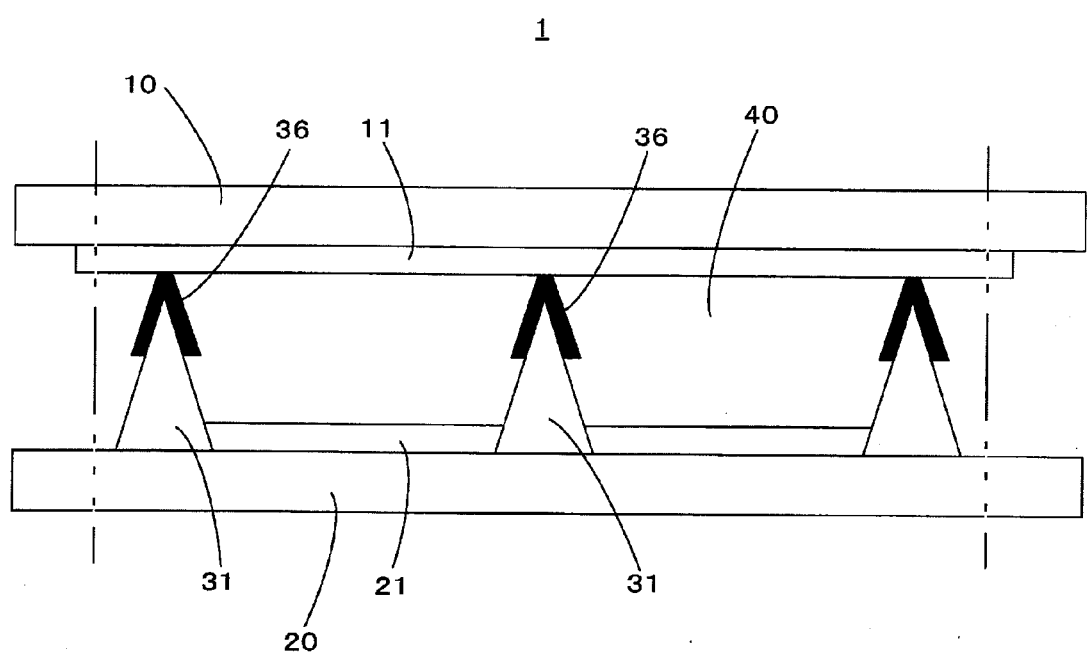
FIG. 6 is a partly enlarged view showing the structure of a black matrix according to a fifth embodiment.

FIG. 6 is a partly enlarged view showing a black matrix structure according to a fifth embodiment. In this diagram, the embodiment is a modification of the aforementioned third embodiment, which is configured in such a way that the amount of coating of the uncured photo-curing resin to be a black matrix 36 is adjusted to cover the tips and parts of the side walls of the partitions 31 with the black matrix 36.

According to this configuration, although the whole partitions 31 are not covered with the black matrix 36 as compared with the third embodiment, it is possible to conceal the range where the partitions 31 are visible through the transparent substrate 10 can be concealed sufficiently.

Figure 7:
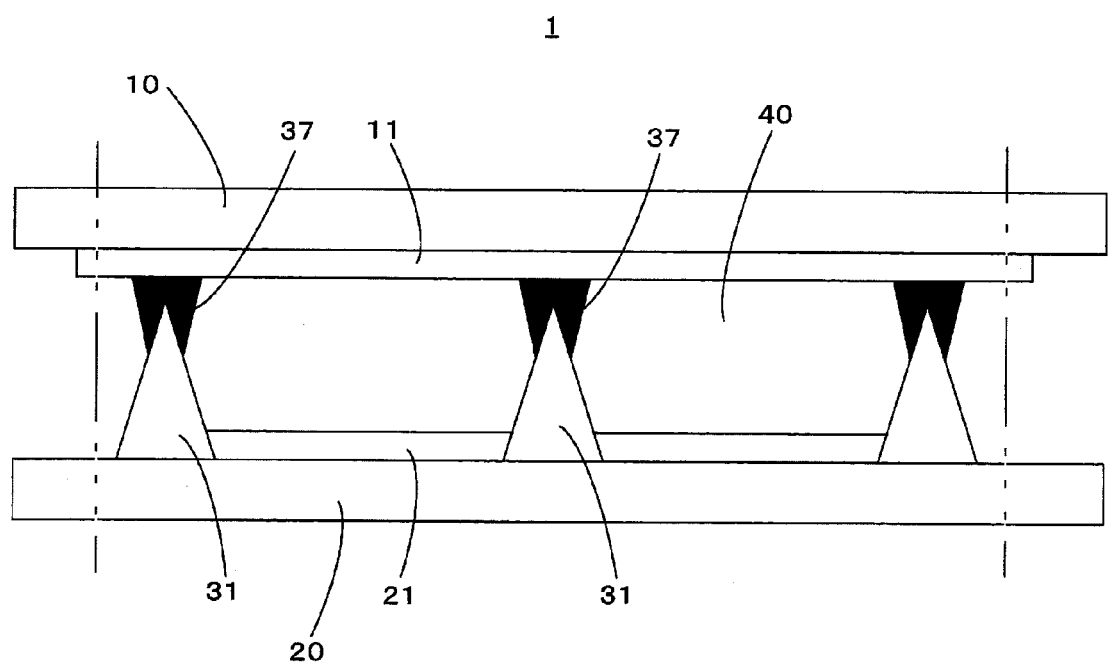
FIG. 7 is a partly enlarged view showing the structure of a black matrix according to a sixth embodiment.

FIG. 7 is a partly enlarged view showing a black matrix structure according to a sixth embodiment. In this diagram, the embodiment takes a configuration such that a black matrix 37 is structured in a reverse wedge or reverse tapered shape with respect to the partitions 31 having approximately a wedge-like cross-sectional shape (tapered shape). Even with this configuration, the tip sides of the partitions 31 which are easily visible through the transparent substrate 10 can be partly concealed with the black matrix 37.

Although the individual pixels are separated by the partition walls each formed by the partition 31 and the black matrix 32, 33, 34, 35, 36, 37 according to the embodiment, it may take a configuration such that each segment includes a predetermined number of pixels. However, when the former configuration is adopted, the contrast is clearly shown for every pixel, and the image visibility of the charged particle migration type display panel 1 becomes higher with the formation of the black matrix 32, 33, 34, 35, 36, 37.

<Display Principle of Charged Particle Migration Type Display Panel>

Next, the display principle of the above-described charged particle migration type display panel 1 will be described briefly. In FIG. 1, supposing that the black charged particles 41 are charged positive and the white charged particles 42 are charged negative, when a potential on the transparent substrate 10 side is set to the reference potential and a predetermined voltage is applied to the pixel electrodes 21 to set the back substrate 20 side positive, the black charged particles 41 are distributed in the vicinity of the transparent substrate 10, and the white charged particles 42 are distributed in the vicinity of the back substrate 20 to display black on the transparent substrate 10.

When the potential on the transparent substrate 10 side is set to the reference potential, and a predetermined voltage is applied to the pixel electrodes 21 to set the back substrate 20 side negative, the black charged particles 41 are distributed in the vicinity of the back substrate 20, and the white charged particles 42 are distributed in the vicinity of the transparent substrate 10 to display white on the transparent substrate 10.

Based on the above principle, a predetermined voltage is applied to the pixel electrodes 21 to control the electric field between the transparent substrate 10 and the back substrate 20 to migrate the individual charged particles 41, 42 to rewrite the display pixel by pixel.

<Manufacturing Method for Charged Particle Migration Type Display Panel>

Hereafter, the manufacturing method for the foregoing charged particle migration type display panel will be described referring to FIGS. 8 to 12.

Figure 8:
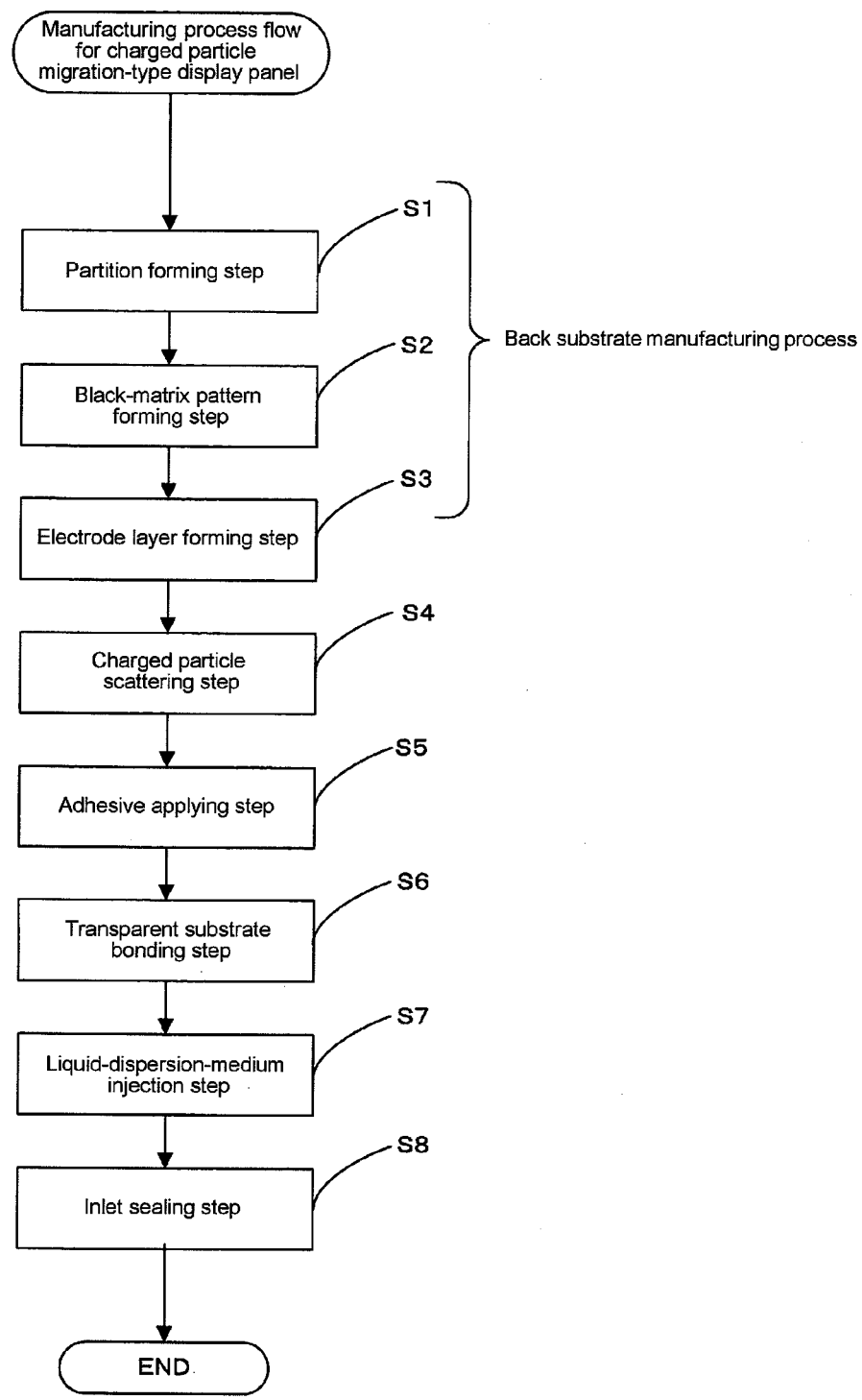
FIG. 8 is a flowchart illustrating a manufacturing process for a charged particle migration type display panel.
Figure 9A:
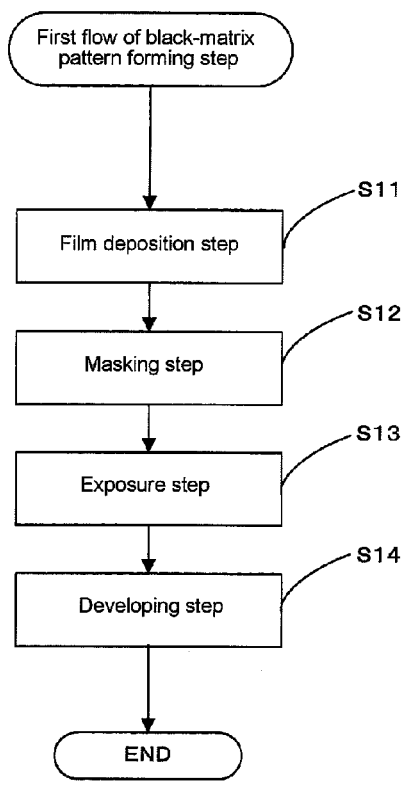
Figure 9B:
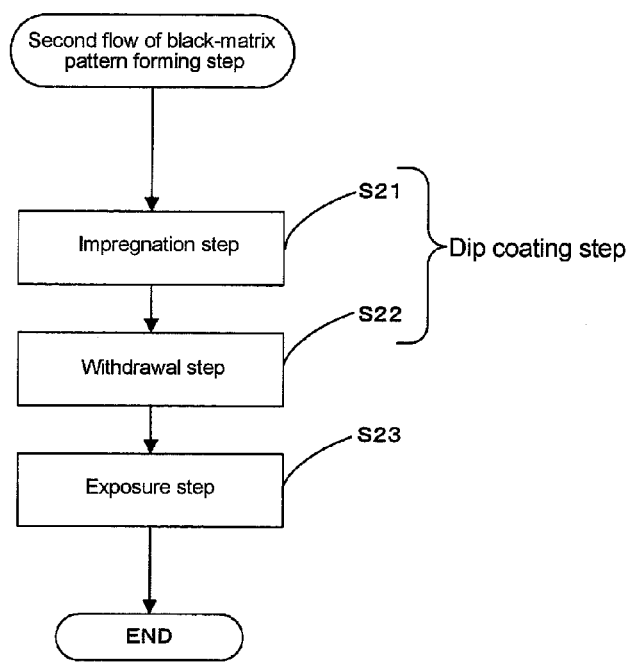
Figure 10A:
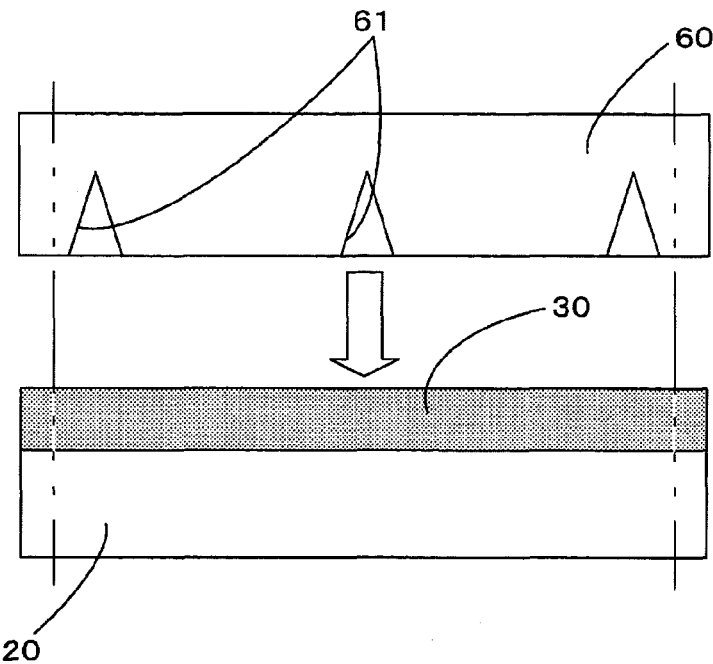
FIGS. 10A to 10C are schematic diagrams showing a partition forming step contained in the manufacturing process for the charged particle migration type display panel.
Figure 10B:
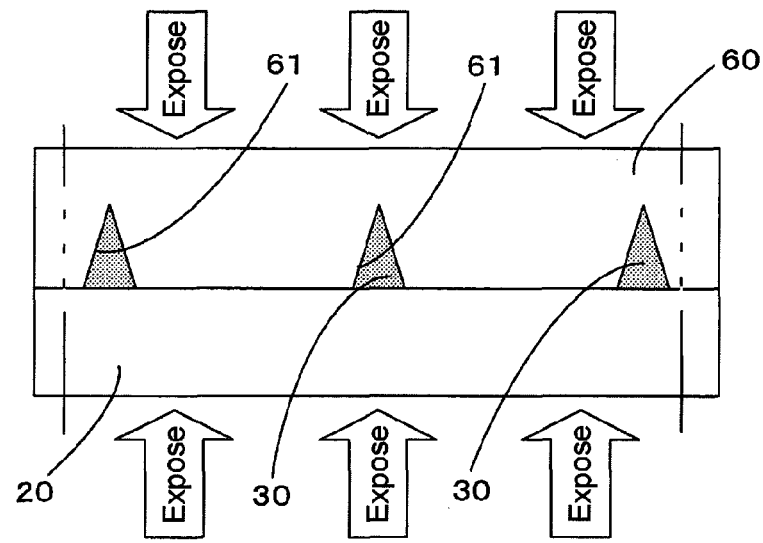
Figure 10C:
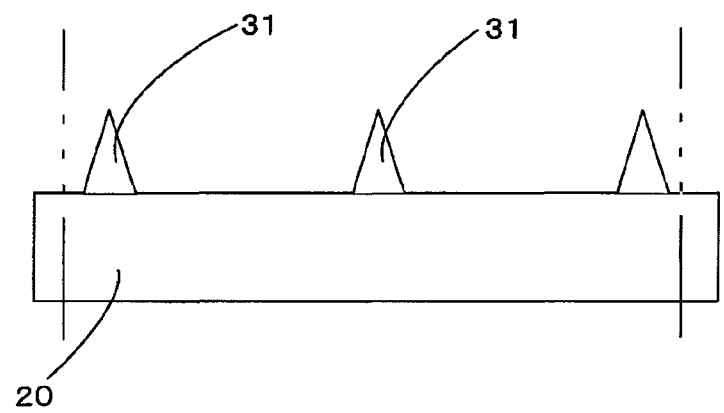
Figure 11A:
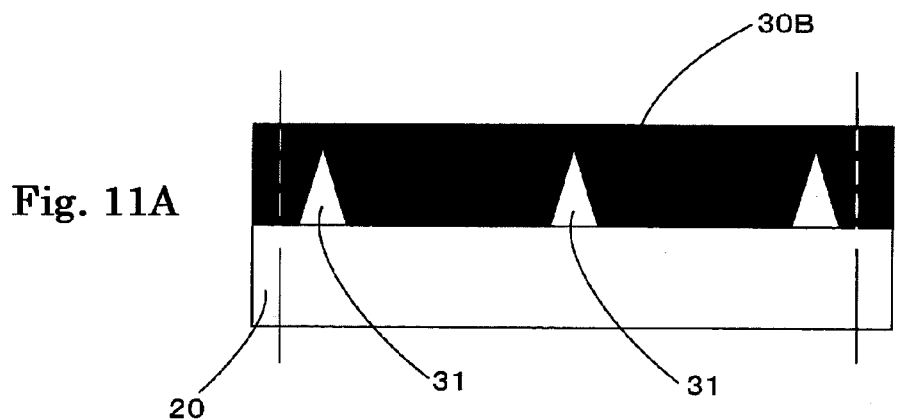
FIGS. 11A to 11C are schematic diagrams showing the black-matrix pattern forming step in FIG. 9A.
Figure 11B:
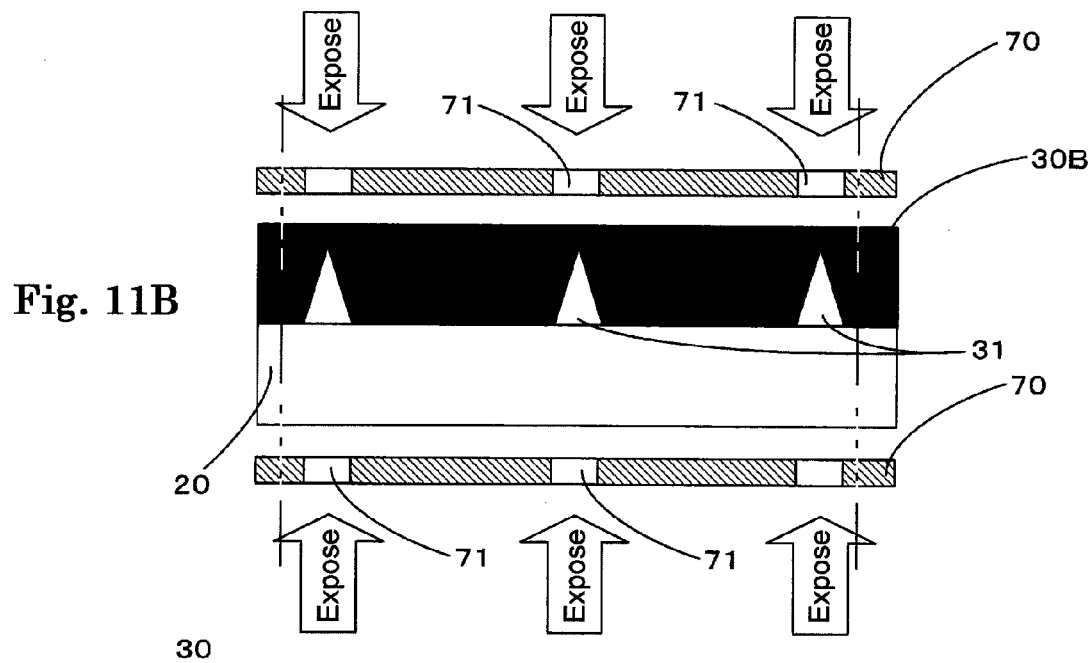
Figure 11C:
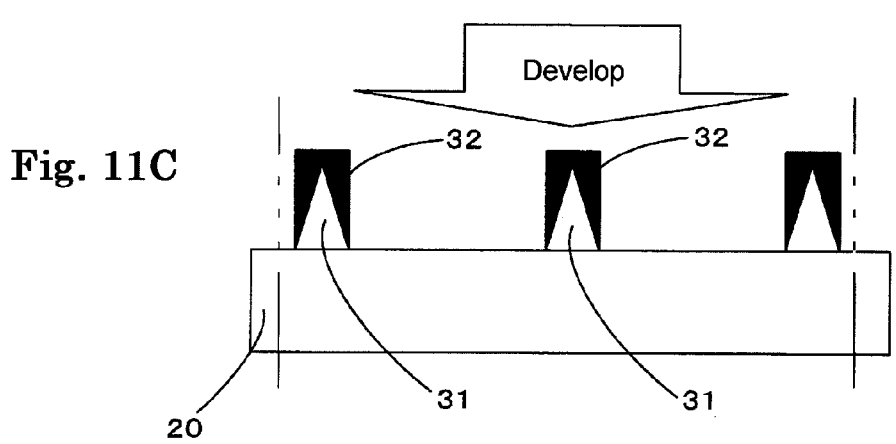

FIG. 8 is a flowchart illustrating a manufacturing process for the charged particle migration type display panel. FIG. 9 is a flowchart illustrating a black-matrix pattern forming step included in the manufacturing process for the charged particle migration type display panel; FIG. 9A shows the first embodiment, and FIG. 9B shows the second embodiment. FIGS. 10A to 10C are schematic diagrams showing a partition forming step included in the manufacturing process for the charged particle migration type display panel. FIGS. 11A to 11C are schematic diagrams showing the black-matrix pattern forming step in FIG. 9A. FIGS. 12A to 12D are schematic diagram showing the black-matrix pattern forming step in FIG. 9B.

The following description is given mainly for the manufacturing process for the back substrate 20, and excludes a detailed description of the step of forming the common electrode 11 on the transparent substrate 10 and steps similar to those in the related art. The charged particle migration type display panel 1 manufactured by this method takes a wet configuration in which the black and white charged particles 41, 42, and a liquid dispersion medium 43 are enclosed in each cell 40.

<<Partition Forming Step>>

First, a partition forming step S1 shown in FIG. 8 is carried out. In this partition forming step S1, the partitions 31 of a transparent photo-curing resin are formed on the substrate surface of the back substrate 20. The partitions 31 can be formed by die pressing using the thermal or UV irradiation type imprinting, melting transfer, or the like. Hereinafter, the formation of the partitions 31 by the UV irradiation type imprinting is described by way of example.

In FIG. 10A, 60 is a transparent metallic mold made of a transparent material, on the mold face of which a concave pattern 61 corresponding to the partitions 31 is formed. With regard to the formation of the concave pattern 61, when the concave pattern 61 of the transparent metallic mold 60 is formed by photolithography, for example, a method of exposing the bottom surface using a resist with low exposure sensitivity, a method of using a gradation mask, or the combination of bottom-face exposure and multi-stage exposure is used. In addition, it is also possible to form the concave pattern 61 by sandblasting or electron beam lithography.

In the partition forming step S1, first, as shown in FIG. 10A, after applying the photo-curing resin 30 in an uncured state to the substrate surface of the back substrate 20 of a transparent material, the transparent metallic mold 60 is placed on the substrate surface of the back substrate 20 (see white arrows in the diagram). Accordingly, as shown in FIG. 10B, the uncured photo-curing resin 30 is filled in the concave pattern 61 of the transparent metallic mold 60. Subsequently, ultraviolet rays are irradiated from the back sides of the transparent metallic mold 60 and the back substrate 20 to cure the uncured photo-curing resin 30. Then, as shown in FIG. 10C, the partitions 31 with a lattice-like pattern is formed on the substrate surface of the back substrate 20 by separating the back substrate 20 from the transparent metallic mold 60.

<<Black-matrix Pattern Forming Step>>

In FIG. 8, next to the partition forming step S1, a black-matrix pattern forming step of forming the black matrix 32, 33, 34, 35, 36, 37 at the partitions 31 formed on the back substrate 20. First, the black-matrix pattern forming step according to the first embodiment will be described referring to FIG. 9A and FIG. 11.

Although the case of forming the black matrix 32 in the black-matrix pattern forming step according to the first embodiment will be described below by way of example, it is possible, in practice, to form the black matrix 32, 33, 34 shown in FIG. 2, 3 or 4 in the black-matrix pattern forming step according to the first embodiment.

First Embodiment

First, a film deposition step S11 shown in FIG. 9A is carried out. In this film deposition step S11, as shown in FIG. 11A, an uncured photo-curing resin 30B which is the material for the black matrix 32 is deposited on the substrate surface of the back substrate 20. At this time, the photo-curing resin 30B is deposited thicker than the height of the partitions 31, so that the partitions 31 are covered with the photo-curing resin 30B. As a method for film deposition of the photo-curing resin 30B, for example, one of spin coating, slit coating, laminate dip coating, etc. is used. The photo-curing resin 30B has a dark-colored coloring material contained therein beforehand to reduce the transmittance to the extent that allows the partitions 31 to be concealed.

Subsequently, a masking step S12 shown in FIG. 9A is carried out. In this masking step S12, as shown in FIG. 11B, the bottom side of the transparent back substrate 20 and the top side of the photo-curing resin 30B are covered with masks 70, 70, respectively. A mask pattern 71 corresponding to the lattice-like pattern of the partitions 31 is formed on each mask 70.

As a method of aligning the mask pattern 71 with the partitions 31, for example, a region where the photo-curing resin 30B is not formed is provided near the peripheral edge of the back substrate 20, and one alignment mark is placed in this region. Another alignment mark corresponding to the former alignment mark is arranged on the mask 70. With the alignment marks on the back substrate 20 and the mask 70 aligned with each other, the mask pattern 71 and the partitions 31 are aligned. When a resin material is used for the back substrate 20, temperature and humidity control are performed beforehand to prepare the mask 70 which adapts itself to a change in the pattern of the partitions 31 originating from the expansion and contraction of the resin material.

Next, an exposure step S13 shown in FIG. 9A is carried out. In this exposure step S13, as shown in FIG. 11B, the photo-curing resin 30B is irradiated with ultraviolet rays via each mask 70. The ultraviolet rays are irradiated penetrating the mask pattern 71 of each mask 70 to cure only those portions of the uncured photo-curing resin 30B which correspond to the mask pattern 71. According to the embodiment, the photo-curing resin 30B is exposed on the outer side as well as from the inside through the transparent partitions 31, so that the photo-curing resin 30B with reduced transmittance can be cured accurately.

Thereafter, a developing step S14 shown in FIG. 9A is carried out. In this developing step S14, the back substrate 20, which has undergone the exposure step S13 for the photo-curing resin 30B, is dipped in an unillustrated developing solution to remove the uncured portion of the photo-curing resin 30B, and leave the cured portion thereof. Then, as shown in FIG. 11C, the black matrix 32 with a lattice-like pattern which covers the whole partitions 31 with a wedge-like cross-sectional shape is formed.

Second Embodiment

Next, the black-matrix pattern forming step according to a second embodiment will be described referring to FIG. 9B and FIG. 12. Although the case of forming the black matrix 36 in the black-matrix pattern forming step according to the second embodiment will be described below by way of example, it is possible, in practice, to form the black matrices 35 to 37 shown in FIGS. 5 to 7 in the black-matrix pattern forming step according to the second embodiment.

Figure 12A:
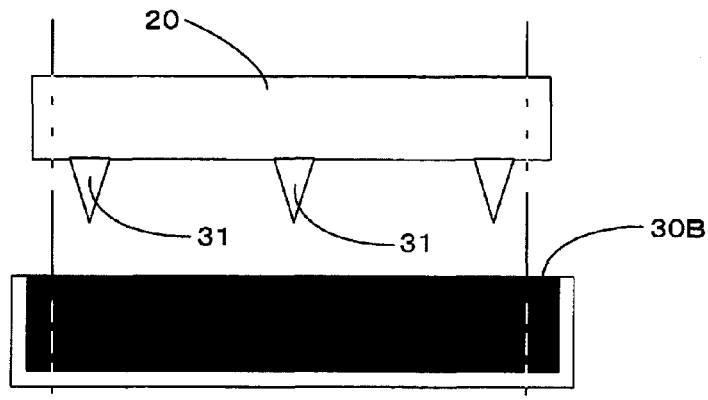
FIGS. 12A to 12D are schematic diagrams showing the black-matrix pattern forming step in FIG. 9B.
Figure 12B:
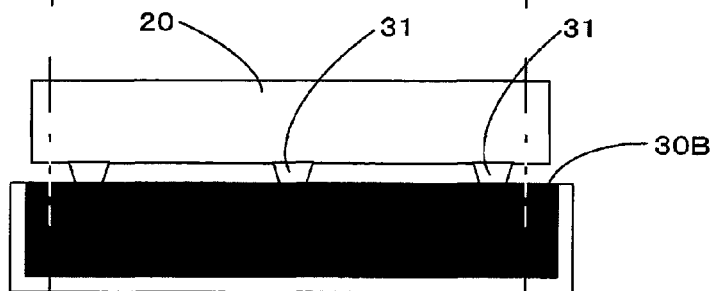

In this embodiment, only the tip portions of the partitions 31 are covered with the photo-curing resin 30B in an uncured state in a dip coating step. First, an impregnation step S21 shown in FIG. 9B is carried out. In the impregnation step S21, as shown in FIG. 12A, the back substrate 20 is placed the top side bottom to place the partitions 31 downward. In this state, as shown in FIG. 12B, only the tip portions of the partitions 31 are impregnated in the uncured photo-curing resin 30B.

Figure 12C:
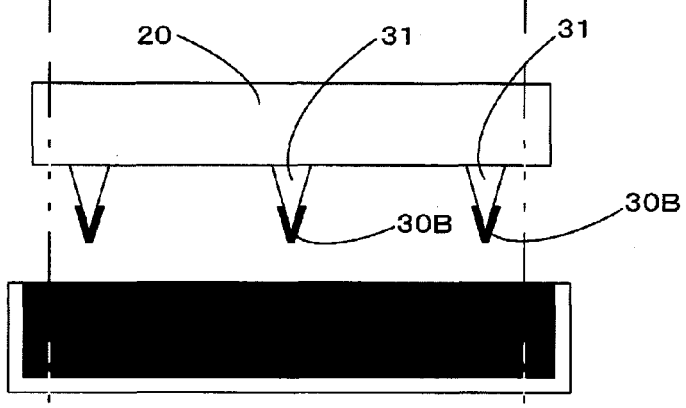
Figure 12D:
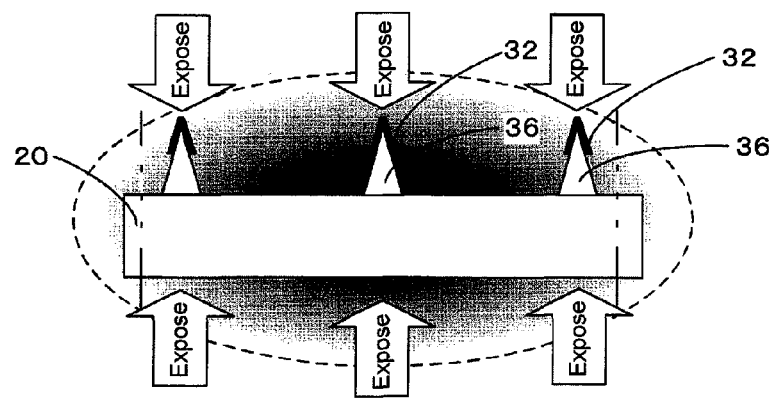

Subsequently, a withdrawal step S22 shown in FIG. 9B is carried out. When the partitions 31 are withdrawn from the uncured photo-curing resin 30B as shown in FIG. 12C, the tip portions of the partitions 31 are covered with the photo-curing resin 30B.

Thereafter, an exposure step S23 shown in FIG. 9C is carried out. In this exposure step S21, ultraviolet rays are irradiated from both the top side and bottom side of the back substrate 20, without using a mask mentioned above. On the top side of the back substrate 20, ultraviolet rays are directly irradiated onto the photo-curing resin 30B. On the bottom side of the back substrate 20, ultraviolet rays are irradiated onto the photo-curing resin 30B from the inside through the transparent partitions 31. Accordingly, the photo-curing resin 30B is cured accurately, forming the black matrix 36 with a lattice-like pattern which covers the tips and parts of the side faces of the partitions 31 with a wedge-like cross-sectional shape.

<<Electrode Layer Forming Step>>

Next, returning to FIG. 8, an electrode layer forming step S3 is carried out. In this electrode layer forming step S3, a metallic material is vapor-deposited on the substrate surface of the back substrate 20 using physical vapor deposition, such as sputtering, thereby forming an electrode layer. Accordingly, the pixel electrodes 21 are formed on the substrate surface of the back substrate 20 (see FIG. 1). The foregoing partition forming step S1, black-matrix pattern forming step S2, and electrode layer forming step S3 complete the manufacturing process for the back substrate 20.

<<Charged Particle Scattering Step>>

Subsequently, a charged particle scattering step S4 shown in FIG. 8 is carried out. In this charged particle scattering step S4, the black and white charged particles 41, 42 are sprayed onto the back substrate 20 using unillustrated nozzles. As a result, the black and white charged particles 41, 42 are contained in each of the cells 40 separated by the partition walls composed of the partitions 31 and the black matrix 32 (or 36) (see FIG. 1).

<<Adhesive Applying Step>>

Subsequently, an adhesive applying step S5 shown in FIG. 8 is carried out. In this adhesive applying step S5, an adhesive 50 (see FIG. 1), such as an ultraviolet curing resin, is applied along the peripheral edge of the back substrate 20 which has undergone the charged particle scattering step S4.

<<Transparent Substrate Bonding Step>>

Next, a transparent substrate bonding step S6 shown in FIG. 8 is carried out. In this transparent substrate bonding step S6, the transparent substrate 10 (see FIG. 1) is placed opposite the back substrate 20 which has the adhesive 50 applied to the peripheral edge thereof, and the peripheral edges of the back substrate 20 and the transparent substrate 10 are firmly fixed with the adhesive 50.

<<Liquid-dispersion-medium Injection Step and Inlet Sealing Step>>

Subsequently, a liquid-dispersion-medium injection step S7 shown in FIG. 8 is carried out. In the liquid-dispersion-medium injection step S7, the liquid dispersion medium 43 is injected between the substrates 10 and 20 through an unillustrated inlet formed in the transparent substrate 10 or the back substrate 20. Accordingly, the liquid dispersion medium 43 injected through the inlet is filled in each cell 40. Thereafter, the inlet is sealed with a sealer in an inlet sealing step S8. Through the above steps, the charged particle migration type display panel 1 shown in FIG. 1 is completed.

<Operational Effects, Etc.>

According to the charged particle migration type display panels 1 according to the foregoing embodiments, the tips and side faces of the transparent partitions 31 can be concealed by the black matrix 32 (33, 34, 35, 36, 37) formed of the photo-curing resin 30B containing a dark-colored coloring material. This black matrix 32 can be exposed on the outer side as well as from the inside through the transparent partitions 31, so that even when the transmittancy is reduced with the dark-colored coloring material, it is still possible to cure the resin accurately. This black matrix 32 can make the transparent side faces of the partitions 31 unseen from the oblique direction to the transparent substrate 10, thereby making it possible to improve the contrast ratio.

The photo-curing resin 30B which forms the black matrix 32 is a general material for the partitions 31, and can secure the sufficient bonding strength between the partitions 31 and the transparent substrate 10 or the back substrate 20. As a result, even when the transparent substrate 10 and the back substrate 20 are both flexible substrates, it is possible to improve the durability to bending.

With the structure where the cross-sectional shape of the partitions 31 is the wedge shape (tapered shape) so that the tips are tapered, the junction area of the photo-curing resin 30B which forms the black matrix 32, and the partitions 31 is increased, thus making it possible to further improve the bonding strength therebetween. In addition, it becomes easier to cover the side faces of the partitions 31 with the black matrix 32, so that the contrast ratio can be improved further. Further, at the time of exposing the photo-curing resin 30B from the inside via the transparent partitions 31, the inclined surfaces of the partitions 31 can reflect visible light, ultraviolet rays, or infrared rays to efficiently cure the photo-curing resin.

When the whole partitions 31 like the black matrix 32, 33 or 34, are covered with the photo-curing resin 30B, the transparent side faces of the partitions 31 can be made thoroughly unseen from the oblique direction to the transparent substrate 10, thereby making it possible to improve the contrast ratio to the maximum. In addition, the lower end of the photo-curing resin 30B which forms the black matrix 32, 33 or 34 is connected to the substrate surface of the back substrate 20, thereby making it possible to increase the connection strength of the black matrix 32, 33 or 34.

The charged particle migration type display panel, the manufacturing method thereof, and the charged particle migration type display device according to the invention are not limited to the foregoing embodiments. For example, although the resin to be the material for the black matrix is a photo-curing resin in the foregoing embodiments, the black matrix according to the invention can be formed using various resin materials other than the photo-curing resin. For example, a thermosetting resin is used as the material for the black matrix, and the dip coating step S21, S22 in FIG. 9B is carried out. Then, the black matrix 35, 36, 37 with the structure shown in FIG. 5, 6 or 7 can be formed by performing a heating process which takes place of the exposure step S23.

DESCRIPTION OF REFERENCE NUMERALS

1 Charged particle migration type display panel
10 Transparent substrate
11 Common electrode
20 Back substrate
21 Pixel electrode
30 Photo-curing resin
30B Photo-curing resin (resin)
31 Partition wall
32-37 Black matrix (photo-curing resin)
40 Display liquid
41 Black charged particle (dark-colored charged particle)
42 White charged particle (light-colored charged particle)
50 Sealer

The invention claimed is:
1. A charged particle migration-type display panel comprising:
  a plurality of cells partitioned by partitions between two substrates placed opposite to each other, with charged particles sealed in the respective cells, wherein
  the partitions provided upright on one of the substrates are formed of a translucent material,
  the partition is formed into a tapered shape or a wedge shape, and
  tips of the partitions and at least parts of side faces thereof are covered with a resin containing an opaque or semi-transparent dark-colored coloring material to form a black matrix structure,
  wherein the resin is set taller than the partition, and a width of a lower end of the resin is set wider than a width of a lower end of the partition, so that the whole partitions are covered with the resin thereby forming a black matrix structure.

* * * * *